US008534186B2

(12) United States Patent
Glucksman et al.

(10) Patent No.: US 8,534,186 B2
(45) Date of Patent: Sep. 17, 2013

(54) METHOD AND APPARATUS FOR BREWING HOT BEVERAGES

(75) Inventors: Dov Z Glucksman, Danvers, MA (US); Laura J Nickerson, Fltchburg, MA (US); Gary P McGonagle, Lynn, MA (US); David N Belanger, Peabody, MA (US)

(73) Assignee: Appliance Development Corporation, Danvers, MA (US)

( * ) Notice: Subject to any disclaimer, the term of this patent is extended or adjusted under 35 U.S.C. 154(b) by 950 days.

(21) Appl. No.: 11/744,502

(22) Filed: May 4, 2007

(65) Prior Publication Data

US 2008/0274246 A1 Nov. 6, 2008

(51) Int. Cl.
*A47J 31/00* (2006.01)

(52) U.S. Cl.
USPC ................. 99/282; 99/283; 99/289 R; 99/319

(58) Field of Classification Search
USPC .......................... 99/289 R, 319, 318, 282, 283
See application file for complete search history.

(56) References Cited

U.S. PATENT DOCUMENTS

| 1,211,614 | A | * | 1/1917 | Morales | 99/283 |
| 1,486,649 | A | * | 3/1924 | Ewert | 99/319 |
| 3,279,351 | A | * | 10/1966 | Cohn | 99/282 |
| 3,665,841 | A | * | 5/1972 | Hardy et al. | 99/281 |
| 4,401,014 | A | | 8/1983 | McGrail et al. | |
| 5,027,696 | A | | 7/1991 | Antonini | |
| 5,609,092 | A | | 3/1997 | Chen | |
| 5,862,739 | A | | 1/1999 | Lin | |
| 6,135,010 | A | | 10/2000 | Husted et al. | |
| 6,240,833 | B1 | | 6/2001 | Sham et al. | |
| 6,241,559 | B1 | | 6/2001 | Taylor | |
| 6,314,237 | B1 | | 11/2001 | Glucksman | |
| 6,405,638 | B1 | | 6/2002 | Chen | |
| 6,422,133 | B1 | | 7/2002 | Brady | |
| 6,431,056 | B1 | | 8/2002 | Fritschi | |
| 6,655,261 | B1 | | 12/2003 | Horstmann | |
| 6,915,733 | B1 | | 7/2005 | Langbauer | |
| 7,093,531 | B2 | | 8/2006 | Tardif | |
| 7,279,660 | B2 | * | 10/2007 | Long et al. | 219/441 |
| 2005/0199129 | A1 | | 9/2005 | Glucksman et al. | |
| 2010/0018403 | A1 | | 1/2010 | Hoare et al. | |

FOREIGN PATENT DOCUMENTS

| WO | 01/88442 A1 | 11/2001 |
| WO | 2004/071258 A2 | 8/2004 |

* cited by examiner

*Primary Examiner* — Reginald L Alexander
(74) *Attorney, Agent, or Firm* — George A Herbster

(57) ABSTRACT

Automatic apparatus for brewing a hot beverage. A control system causes a heater that is integral with a beverage container to elevate the water temperature to a predetermined brewing temperature while infusible material in an infuser basket is isolated from the liquid. When the brewing temperature is achieved, the controller causes a positioner assembly to submerge the infuser basket in the heated liquid. The control system maintains the liquid at a predetermined brewing temperature. After a predetermined brewing interval, the control system causes the positioner assembly to raise the infuser basket thereby to isolate the infusible material from the brewed beverage. Thereafter the control system may maintain the beverage temperature at an optimal serving temperature.

20 Claims, 15 Drawing Sheets

METHOD AND APPARATUS FOR BREWING HOT BEVERAGES

BACKGROUND OF THE INVENTION

1. Field of the Invention

This invention generally relates to a methods and apparatus for brewing hot beverages from an infusible material for consumption and more particularly to a method and apparatus for brewing beverages, such as coffee and/or tea, wherein the infusible material is submerged and emerged from a brewing liquid.

2. Description of Related Art

Many methods for brewing coffee or steeping tea have emerged over time. Coffee is brewed by percolation, by infusion with water under pressure and by other methods. In one such method, coffee grounds or tea leaves, as an infusible material, are brought into contact with a large body of heated water for a predetermined time to effect the brewing or steeping of a beverage. After the infusible material is removed, the beverage is ready to be poured from a pot.

Over time certain criteria have been recognized as critical to brewing hot beverages, such as coffee and tea, successfully. Some of these criteria are outside the control of the manufacturers of beverage brewing apparatus. For example, tea drinkers control the quality and quantity of the water and tea leaves used to brew the beverage. Water quality is important to avoid any noticeable unpleasant taste that may exist when the brewing liquid is tap water with constituent metallic compounds, chlorine-containing or other compounds. Water should always be fresh; previously boiled, stagnate or distilled water should not be used. Tea leaves should be measured with care to obtain acceptable tea strength. Consumers control analogous criteria with respect to coffee in terms of a coffee brand selection, the fineness of the resulting coffee grounds and the ratio of water and coffee grounds during brewing.

Brewing apparatus can control other important criteria for successfully brewing a hot beverage. For example, apparatus can control steeping or brewing, temperature and time. As an example, the following table shows preferred steeping temperatures and times for different types of tea.

TABLE

PREFERRED STEEPING TEMPERATURES AND TIMES FOR TEAS

| Tea Type | Recommended Steeping Temperature: | Recommended Steeping Time: |
|---|---|---|
| Black | Water at a full, rolling boil, (212° F.; 100° C.) | Steep 4–6 minutes, except Darjeeling, which should be steeped 2–3 minutes. |
| Oolong | Water slightly below boiling (190–203° F.; 87–95° C.). | Varies dramatically. Many are perfect at 3–4 minutes. Some need 6–8 minutes. |
| Green | Slightly cooler water, (160–180° F.; 71–82° C.). | 2–3 minutes. |
| Herbal | Water typically is boiling water. | Minimum 4–6 minutes. Some up to 10 minutes. |
| White | Cooler water (150–160° F.; 65–71° C.). | Around 2 minutes, although some can be steeped much longer with good results. |
| Puerh | Slightly cooler water, (160–180° F.; 71–82° C.). Also made with boiling water | At least 7–8 minutes. Some up to 20 minutes. |

TABLE-continued

PREFERRED STEEPING TEMPERATURES AND TIMES FOR TEAS

| Tea Type | Recommended Steeping Temperature: | Recommended Steeping Time: |
|---|---|---|
| | and steeped for a long time. | |

Apparatus can assure several other criteria are met. For example, apparatus can be constructed to assure a brewing volume that is sufficient to enable tea leaves to expand up to three to five times in size during steeping. If the volume is insufficient for this "blooming," the tea leaves do not fully release their flavor into the beverage. Apparatus can separate the infusible material from the beverage after brewing. Beverages that steep or brew too long may turn bitter or overly strong. Apparatus can also control and customize liquid temperature after the interval to an optimal serving temperature. As shown in the foregoing table, while the preferred brewing temperatures can be anywhere between 65° C. and 100° C. for different teas, water between 90° C. and 95° C. is best for brewing coffee. Serving temperatures for these beverages typically are in the range from 70° C. to 80° C.

In recent years, the so-called "French Press" method of brewing coffee has become a popular standard and has also been adapted for steeping tea. Apparatus for implementing this method includes a plunger with a disk made of a perforated metal mesh that fits snugly inside a glass beaker. A user removes the plunger from the glass beaker and fills the glass beaker with hot water that was heated, typically externally in a water kettle. The user then adds an appropriate quantity of coffee grounds to the water and stirs the mixture to assure proper distribution of the fusible material throughout the liquid. Then the user places the plunger assembly on top. Throughout the following brewing interval (e.g., 5 minutes), the water temperature remains fairly constant. During this brewing interval and thereafter the glass and stainless steel of the apparatus minimize any leaching of materials into the beverage that could introduce any unwanted flavor or impurity. After the user determines that an appropriate brewing interval ends, the user pushes the plunger down to the bottom of the beaker. This displaces most of the grounds toward the bottom of the beaker. Then the disk on the plunger isolates the grounds from the brewed beverage to terminate any significant brewing thereafter.

Although the French Press is a popular standard, it has certain drawbacks. This apparatus can not maintain the beverage at an appropriate serving temperature for more than a few minutes. Consequently, it is best to serve the beverage immediately upon completion of the brewing cycle. Such apparatus can be tedious to use. It requires the user to perform all the steps that are critical to the brewing of a beverage with good taste and are capable of being performed automatically. Cleaning is difficult because used grounds remain on the bottom of the beaker. The user must dispose of these used grounds and clean the beaker before the French press apparatus can be reused.

Various proposals have been made to overcome some or all of these undesirable characteristics of the original French press configuration and apparatus. For example, in U.S. Pat. No. 6,240,833 (2001) to Sham et al. an automatic French press beverage maker includes a water heater to elevate water temperature to a level that is higher than otherwise provided. After heated water is poured into a container, it is recirculated until the desired preselected temperature is reached. Then the boiled water transfers into a carafe.

U.S. Pat. No. 6,422,133 (2002) to Brady discloses a French press coffeemaker with an assembly to reduce contact of grounds with the liquid coffee after termination of a steeping period. The approach is to allow liquid to pass through the plunger more readily than with prior French press plungers and to isolate the used grounds from the coffee after the steeping period in a more complete fashion. U.S. Patent Application Publication No. 2005/0199129 (2005) to Glucksman et al. discloses an alternative structure that improves isolation. However, the remaining issues for a French press apparatus that require manual intervention including cleaning continue to exist.

With each of these French press variations, the user still needs to measure the brewing interval, move the plunger manually and clean the carafe between uses. None of the apparatuses according to these variations automatically controls any aspect of the brewing operation.

Various other apparatuses incorporate the isolation feature of French press coffeemakers, but have been developed to include some, but not all, of the criteria for brewing beverages. For example, U.S. Pat. No. 4,401,014 (1983) to McGrail et al. discloses an automatic coffee brewing apparatus in which a glass container supported on an electric heating plate includes a brew basket, or infuser. The infuser is pushed into the liquid and latched in place. The liquid is heated. An impeller in the brew basket rotates to circulate liquid through the brew basket. When the water reaches a predetermined temperature, a latch releases thermostatically and the brew basket floats up to position the spent coffee grounds above the beverage.

In U.S. Pat. No. 5,027,696 (1991) to Antononi a device for automatic brewing includes a timer. The timer controls the transport of a mesh coffee basket containing the coffee grounds from a submerged position to an emerged position through a rack and pinion drive.

U.S. Pat. No. 6,135,010 (2000) to Husted et al. discloses a coffeemaker with a computerized steeping control. A user normally lowers a filter basket into a glass coffeepot. During this operation a spring compresses and, at the end of travel, a latch engages the filter basket. When the brewing interval ends, the control energizes releasing the latch whereupon the spring moves the filter basket above the beverage.

U.S. Pat. No. 6,405,638 (2002) to Chen discloses a hot drink steeping pot with a pivoting strainer. A covered strainer carries the infusible material and immerses in the liquid in a jug. A concave lid covers the jug. When the steeping time is complete, the user manually rotates the basket 180° to nest in the lid which can then be removed and inverted to carry the grounds away from the jug.

U.S. Pat. No. 6,431,056 (2002) to Fritshi discloses a beverage infuser with a brewing receptacle and a brewing sieve that contains the material required for brewing. A mechanical-hydraulic device acts as a timer and controls the weight on the sieve which otherwise floats.

U.S. Pat. No. 6,655,261 (2003) to Horstmann discloses a tea/coffeepot with a pivoting strainer. A user fills the pot with water to an appropriate level. A strainer body including the material to be infused travels in an arcuate path to a submerged position. When the brewing time has been completed, the user moves a handle downward to retract the strainer from the liquid into an emerged position along the same arcuate path.

Each of these patents describes certain features that overcome specific shortcomings associated with the French press method, and each offers features that improve the process of steeping tea. However, none of them addresses all the issues. For example, U.S. Pat. No. 4,401,014 does not disclose concepts of temperature control and easy cleaning, although it does describe agitation by a mechanical structure that complicates manufacture and make the apparatus difficult to clean. U.S. Pat. No. 6,135,010 discusses the concept of temperature control and describes what appear to be inherent thermal currents. However, nothing in this patent or the other patents, discloses both automatic submerging and emerging of the infusible material into and from the beverage. U.S. Pat. No. 6,135,010 also does not disclose a method for removing the spent infusible material for cleaning.

Consequently, a consumer who wishes to purchase such apparatus must compromise by selecting apparatus that provides some, but not all, of the desirable criteria. What is needed is a method and apparatus for producing a hot beverage from an infusible material in which the temperature is automatically controlled to be at an optimal value during the brewing process and thereafter, wherein the liquid is agitated during brewing to assist in the extraction of flavor, wherein the spent infusible material is isolated from the beverage on completion of brewing, wherein the apparatus is adapted for easy use and cleaning and wherein the apparatus is relatively easy to manufacture.

SUMMARY

Therefore it is an object of this invention to provide a hot beverage brewing apparatus and method that will brew coffee or tea to the most exacting standards.

Another object of this invention is to provide a hot beverage brewing apparatus that is easy to operate and intuitive to use.

Yet another object of this invention is to provide a hot beverage apparatus for brewing tea that addresses the diverse temperature and steeping time criteria for a variety of teas.

Still yet another object of this invention is to provide an apparatus which isolates the infusible materials immediately upon completion of brewing or steeping.

Yet still another object of this invention is to provide a method and apparatus whereby the brewed beverage can be maintained at a proper serving temperature for an extended time.

In accordance with one aspect of this invention, apparatus for brewing a beverage from an infusible material in a liquid during a brewing interval contains the liquid in a beverage container adapted to pour the brewed beverage therefrom. A base supports the beverage container during the brewing interval. An infuser basket and infusible material are positioned initially in an emerged position spaced above the contents of the beverage container. A heater increases the temperature of the contents to a predetermined brewing temperature. A positioner displaces the infuser basket from the emerged position to a submerged position for brewing the beverage over a predetermined brewing interval when the liquid reaches the brewing temperature.

In accordance with another aspect of this invention, apparatus for brewing a beverage by infusing an infusible material with a liquid during a brewing interval includes a beverage container for the liquid that includes a handle for pouring the beverage. A base includes electrical contacts and locates the beverage container thereon in connective alignment with the electrical contacts. A heater elevates the temperature of the beverage container contents to a predetermined brewing temperature. An infuser basket has a permeable body for the infusible material. A positioner attached to the infuser basket lowers and raises the infuser basket into and from the beverage container contents at the beginning and end of the brewing interval, respectively.

In accordance with still another aspect of this invention, a method for brewing a beverage by infusing a material in an infusion basket with a liquid in a beverage container during a brewing interval includes elevating the temperature of the beverage container contents to a predetermined brewing temperature by means of a controlled heater assembly. Upon reaching the predetermined temperature the infuser basket automatically submerges. The beverage container contents are maintained at the brewing temperature. Upon completion of the brewing interval, the infuser basket is automatically removed from the brewing container contents.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
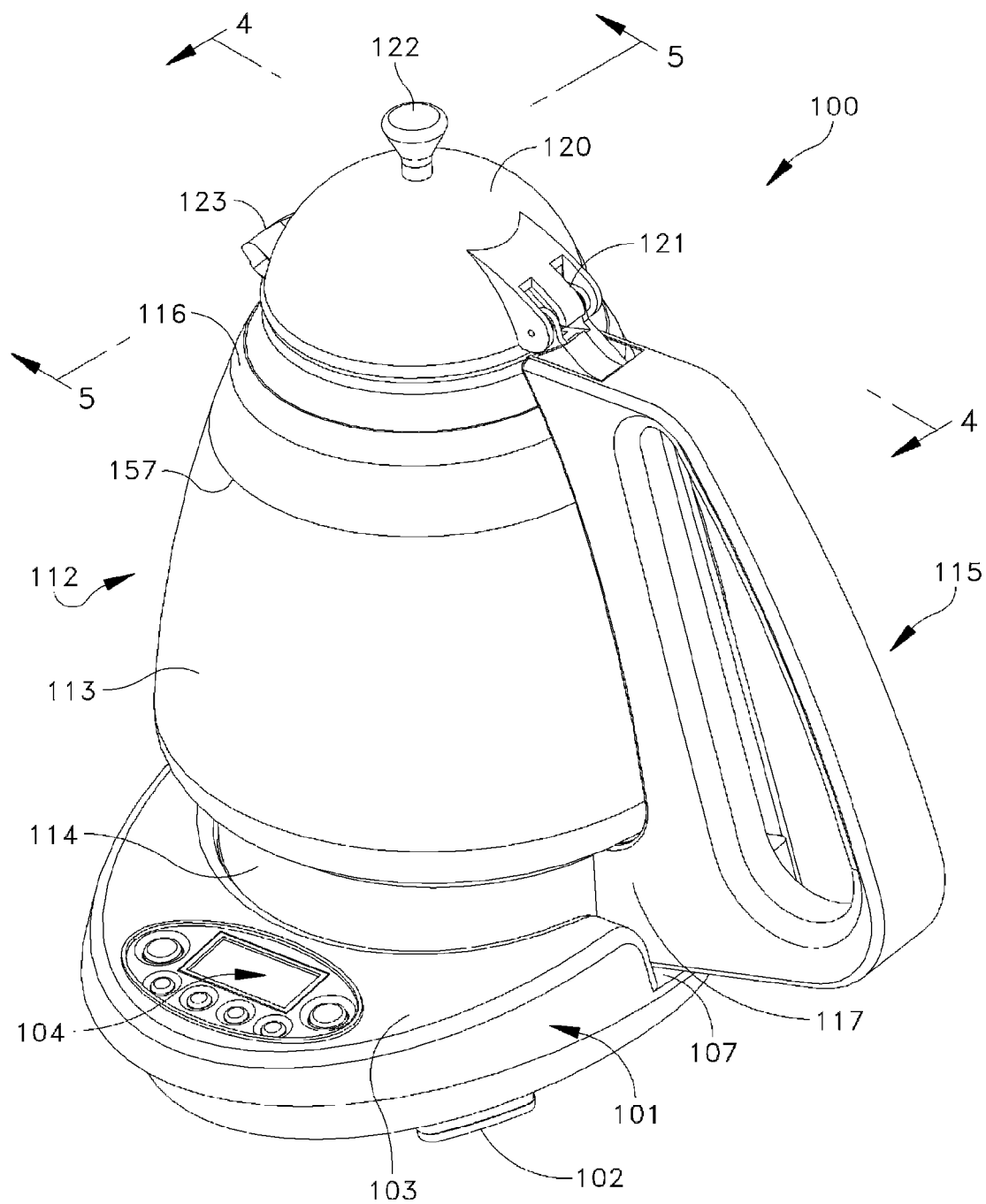
FIG. 1 is a perspective view of a tea steeping apparatus according to the invention.

FIGS. 1 through 5 collectively depict a first embodiment of a hot beverage brewing apparatus constructed in accordance with this invention in the form of a tea steeper apparatus 100. As shown particularly in FIGS. 1 through 3, the tea steeper 100 includes a base unit 101 with feet 102 that rest on a counter. A front housing 103 carries a display control panel 104. The base 101 additionally includes a rear housing 105. As shown particularly in FIG. 3, the front housing 103 and rear housing 105 define a circular floor 106 with diametrically opposed gaps 107 and 108. The floor 106 includes a central upstanding circular electrical power connector 110 and connector blocks 111A and 111B. In this specific embodiment the connector blocks 111A and 111B align along an axis through the central male connector 110 that is substantially at right angles to an axis inclusive of the gaps 107, 108 and the central connector 110.

Still referring to FIGS. 1 through 5, the tea steeper 100 additionally includes a beverage container in the form of a teapot 112 that the base unit 101 supports on the floor 106. The teapot 112 includes a fragile glass container 113 for the water and a base 114. The base 114 contains structures that interact with the central connector 110 and the connector blocks 111A and 111B and the front and rear housings 103 and 105 as described more fully hereinafter. The base 114 supports the beverage container 113 and a handle assembly 115 that extends between an upper support band 116 and a base portion 117 that ties into the base 114. Thus, the handle assembly 115 is integral with the base 114 and the beverage container 113. The teapot 112 additionally includes a concave cover 120 that attaches to the handle assembly 115 by means of spaced hinges 121. A knob 122 facilitates an individual's opening and closing of the cover 120. The beverage container 113 also has a pouring spout 123 diametrically opposite the handle 115.

Figure 2:
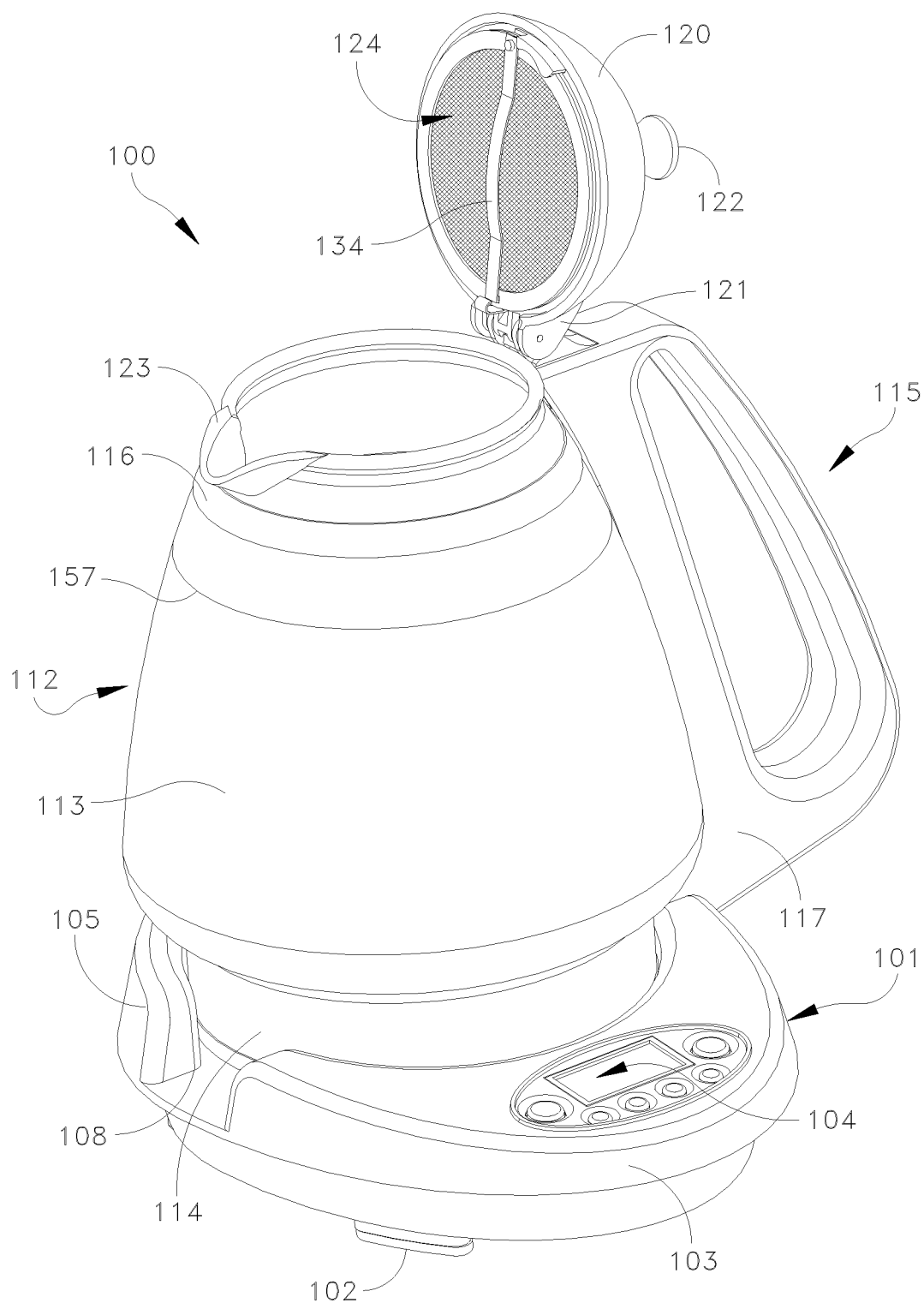
FIG. 2 is another perspective view of the tea steeping apparatus of FIG. 1, with its lid open.
Figure 6A:
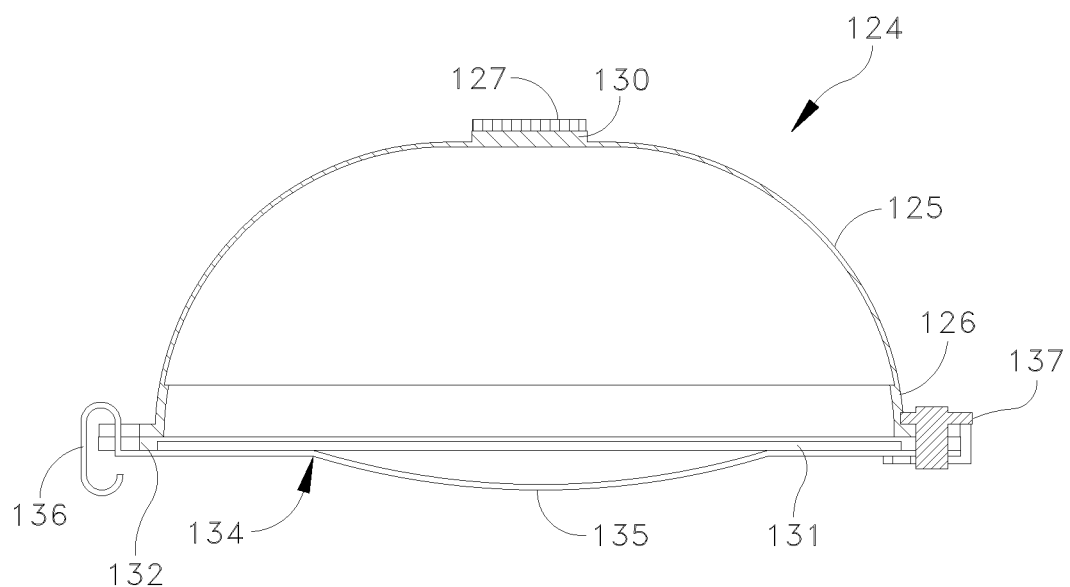
FIGS. 6A and 6B are planar and perspective views, respectively, of an infuser basket shown in FIGS. 2, 4, 9 and 10 in the closed and open states.
Figure 6B:
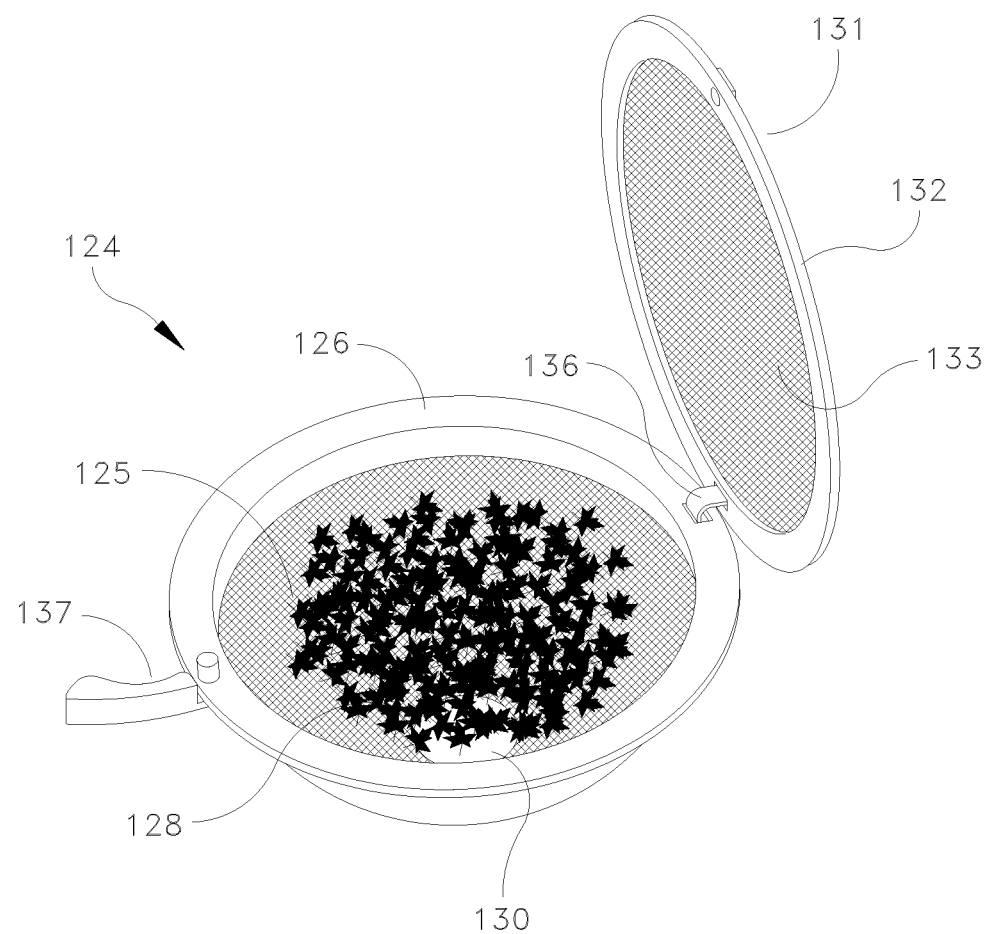

FIG. 2 depicts the tea steeper 100 with the cover 120 open to show an infuser basket 124 for carrying tea leaves during the brewing process. As described later, the infuser basket 124 nests in the cavity of the cover 120 and can move between its "emerged" position in the cavity to its "submerged" position in liquid in the beverage container 113. FIGS. 6A and 6B depict the infuser basket 124 including a concave basket 125 formed of a permeable barrier with a peripheral support flange 126 at the periphery. The concave basket 125 is formed, in one implementation, of a stainless steel woven mesh supported by a stainless steel flange. The concave basket 125 carries a disk 127 of a paramagnetic material and tea leaves 128 as the infusible material. A support 130, for example in the form of a washer, supports the disk 127 in the concave basket 125.

The infuser basket 124 also includes a cover 131 that, in this particular embodiment, is formed of a ring 132 that supports a permeable barrier, for example a woven stainless steel mesh.

A flat strip 134, typically of stainless steel, has a curved midsection 135 and terminates at one end in a loop 136 and at the other end in a clasp 137. When the clasp 137 is open, as shown in FIG. 6B, the cover 131 is free to be open as the loop 136 extends through apertures on the flange 126 and the annular band 132 to act as a hinge. This allows the infuser basket 124 to be filled with the tea leaves 128. It also facilitates cleaning of the infuser basket 124 after use. In use, the clasp 137 overlies the annular ring 132 on the cover 131 and the flange 126 to prevent the escape of tea leaves from the infuser basket 124.

Figure 4:
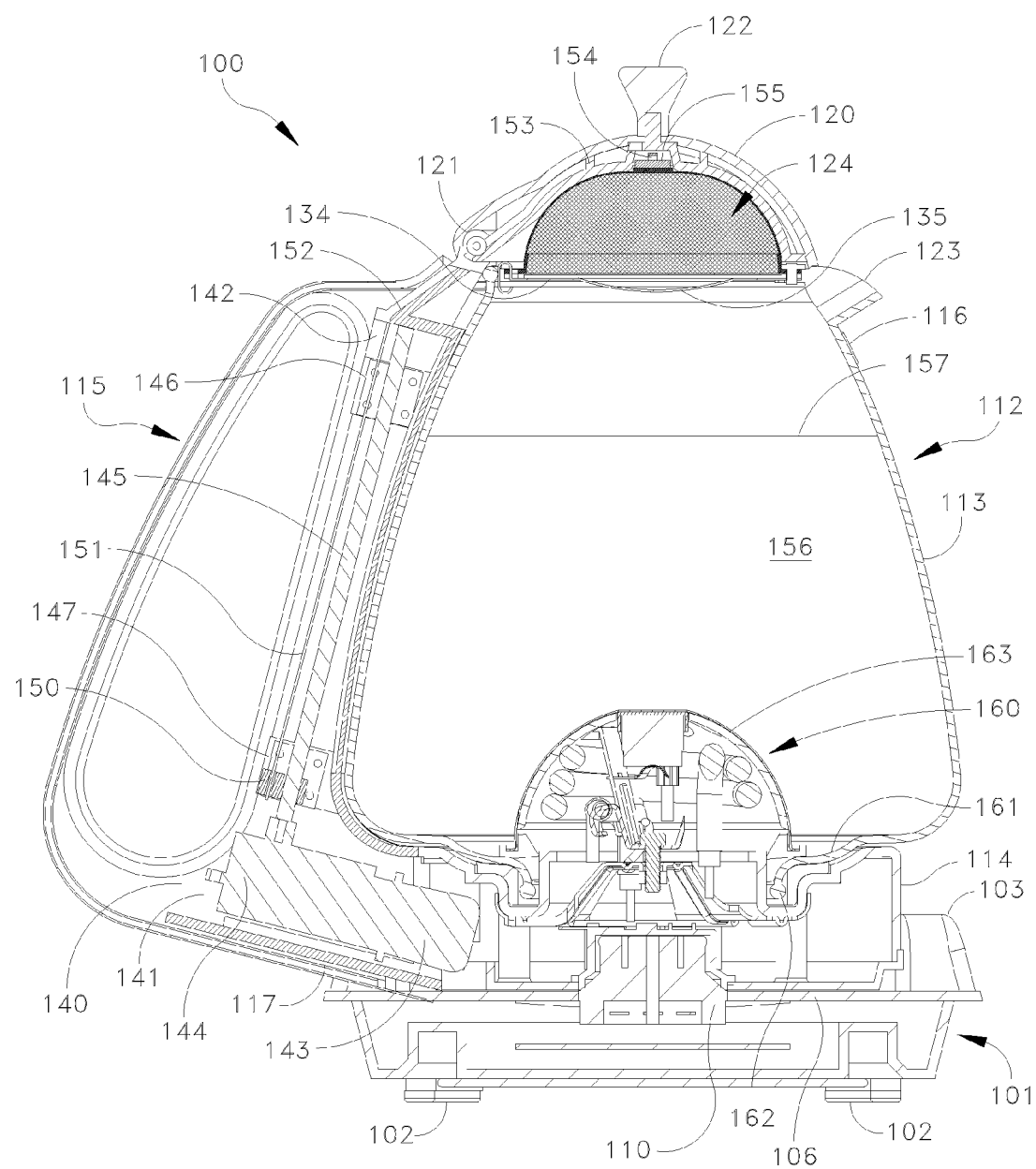
FIG. 4 is a cross sectional view of the tea steeping apparatus taken along lines 4-4 of FIG. 1 with the tea infuser basket in an emerged position.
Figure 5:
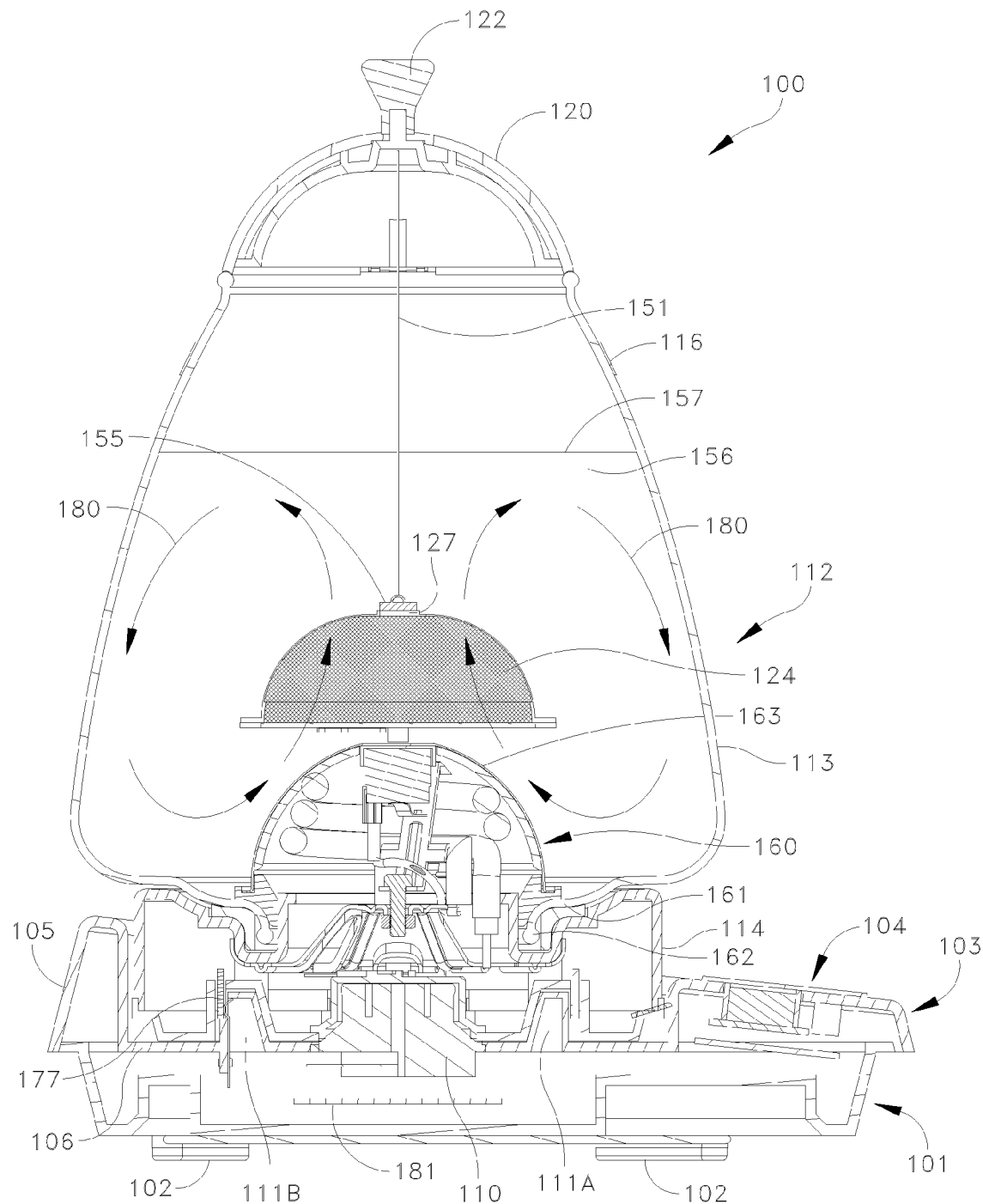
FIG. 5 is a cross sectional view of the tea steeping apparatus taken along lines 5-5 of FIG. 1 with the tea infuser basket in a submerged position during the steeping process.

Referring now specifically to FIGS. 4 and 5, in this embodiment an electro-mechanical positioner 140 is integral with the teapot 112 and moves the infuser basket 124 between the emerged position shown in FIG. 4 and the submerged position shown in FIG. 5. In the emerged position the infuser basket 124 nests in the cover 120.

The positioner 140 resides in a cavity 141 and passage 142 formed in the handle 115. The handle 115 supports an electric drive motor 143 and a right-angle speed reducer 144 in the cavity 141 thereby to rotate a threaded output shaft 145 supported in the passage 142. An upper limit switch 146 and lower limit switch 147 are positioned at the ends of the output shaft 145.

The output shaft 145 also carries a shuttle 150 that attaches to one end of a cable 151, as one example of a flexible connector. The cable 151 extends through the passage 142, a passage 152 at the top of the handle assembly 115 and a passage through the spaced hinges 121 into cable guides 153 formed in the cover 120. At a turning point 154, the cable 151 terminates with a magnet 155 that attaches to the paramagnetic pickup 127 with sufficient force normally to keep the infuser basket 124 attached to the positioner assembly 140. Thus as shown in FIGS. 2 and 4, the positioner assembly 140 holds the infuser basket 124 in its nested, emerged position within the cover 120.

When the infuser basket 124 is in the emerged position, the curved midsection 135 of the flat strip 134 does not contact the cover 131. Consequently the curved midsection 135 provides a cool gripping point on the infuser basket 124 and facilitates the removal of the infuser basket 124 from the cover 120 for filling and cleaning. The user merely exerts a force on the curved midsection 135 that overcomes the attractive force the magnet 155 exerts.

To brew tea, a user fills the teapot 112 with an appropriate amount of water 156, such as to a level indicated by a marker 157 and loads the infuser basket 124 and its contained tea leaves into the cover 120 to establish contact with the magnet 155. Then the user closes the cover 120 to locate the infuser basket 124 in the emerged position above the water 156. As described later, when conditions for brewing are met, a control energizes the motor 143 whereupon the right angle speed reducer 144 rotates the output shaft in a direction that moves the shuttle 150 upward in the passage 142. As the cable 151 pays out, the weight of the infuser basket 124 lowers it into the water 156 to a level as shown in FIG. 5, above and proximate a heater 160. The control system them de-energizes the motor 143 when the shuttle 150 closes the upper limit switch 146, so the infuser basket 124 stays in that submerged position.

Upon completion of brewing, the control energizes the motor 143 in a reverse direction causing the output shaft 145 to move the shuttle 150 downwardly along the passage 142 thereby to retract the infuser basket 124 to its emerged position in the cover 120 as shown in FIG. 4. The control system then de-energizes the motor 143 when the shuttle 150 closes the lower limit switch 147, so the infuser basket 124 comes to rest. As a result any interaction between the contents of the infuser basket 124 and the brewed beverage contents of the beverage container 113 ceases.

Figure 7:
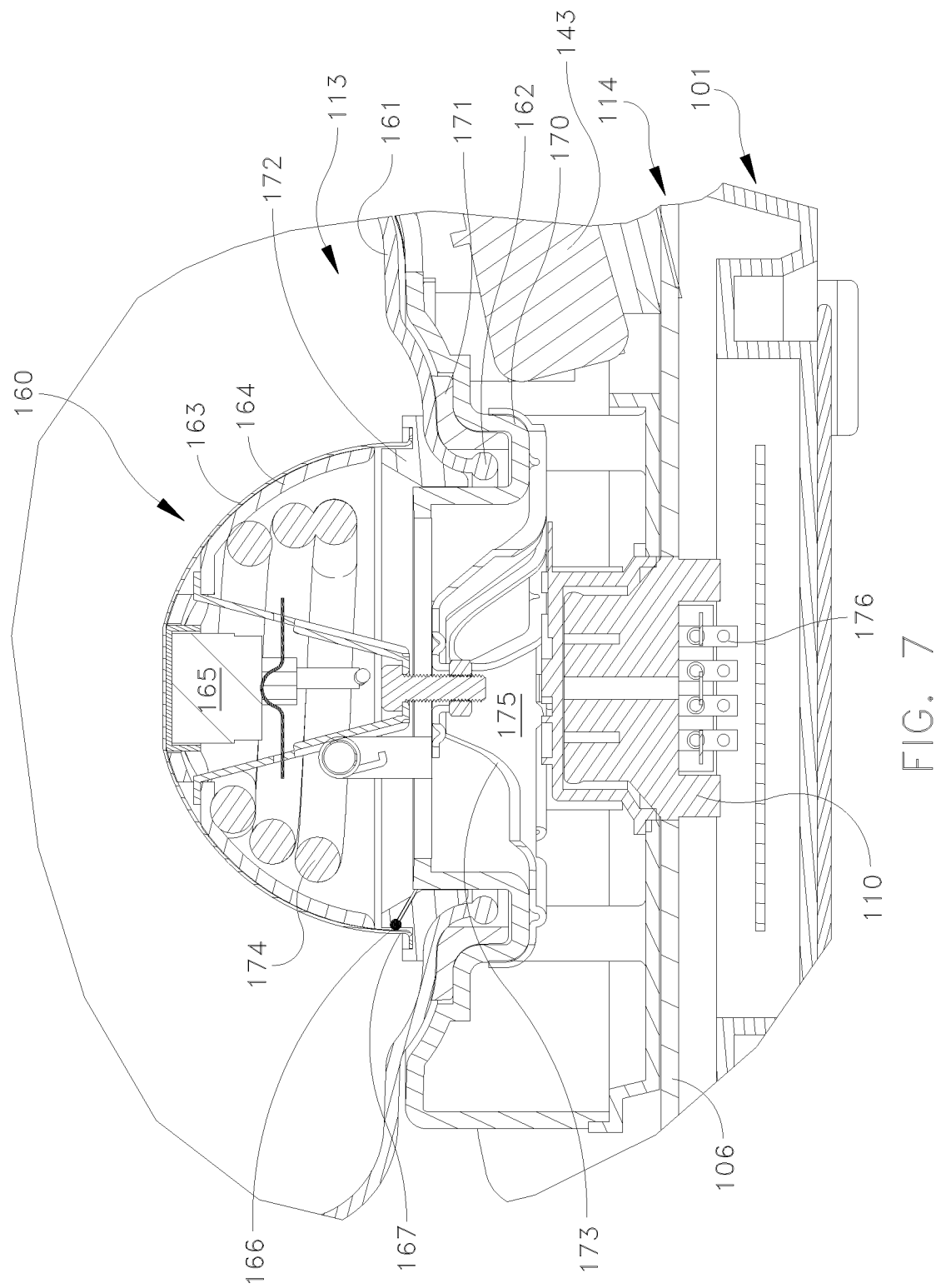
FIG. 7 is an enlarged cross sectional view of the heating element of the tea steeper shown in FIG. 1.

Referring to FIG. 7, in this first embodiment the teapot includes an integral heater assembly 160 that spans and closes a bottom opening that an inwardly directed bottom portion 161 and glass bead 162 form. The heater assembly 160 is a variation of a heater assembly disclosed in U.S. Pat. No. 6,314,237 (2001) for a Vapor Generator assigned to the same assignee as the current invention. The heater assembly 160 includes, as its significant components, an outer semispherical stainless steel shell 163 and an adjacent inner semispherical heat conducting shell 164. A thermal circuit breaker 165 interrupts current through the heater 160 if the water level falls before the top of the outer shell 163.

In this embodiment, the heater assembly 160 additionally includes a temperature sensing device, such as a thermistor 166 that contacts an extension 167 of the outer shell 163 beyond the inner shell 164. Testing has confirmed that the temperature of this position accurately tracks the average water temperature in the beverage container 113.

The base 114 includes a U-shaped channel 170 that receives the glass bead 162 and adjacent portion 161 of the beverage container 113. High temperature seals 171 and 172 lie on opposite sides of the portion 161 and glass bead 162 thereby to seal that portion of the beverage container 113. These seals prevent liquid in the teapot 112 from leaking through the bottom opening in the beverage container 113.

The base 114 additionally includes an open or web-like support structure 173 bounded by the U-shaped channel 170. The support structure provides a structure for clamping the various elements together whereby the seals 171 and 172 perform the sealing functions, and isolate the fragile glass from the hard plastic enclosure. This structure defines a cavity that enables the positioning of various conductors from the central connector 110 and the connector blocks 111A and 111B, shown in FIG. 5, to the drive motor 143, the limit switches 146 and 147, the thermistor 166 and a heating coil 174 in the heating assembly 160. The connector blocks 111A and 111B include terminals 176.

Still referring to FIG. 5, the terminals 176 of connector block 111B on the left are shown as contacting terminals 177 supported by the lower portion of the housing 114. In this embodiment these contacts provide a path for the temperature sensor and limit switch signals and power to the gear motor 133. The central connector 110 provides a pathway for the conductors that provide power to the heater.

The teapot 112 shown in FIGS. 1 through 5 therefore is characterized by including the integral heater assembly 160 and the integral electro-mechanical positioner assembly 140 for moving the infuser basket 124 between emerged and submerged positions in a controlled manner. The teapot 112 is further removable from the base 101 for pouring and for cleaning. The symmetry of the central connector 110 and the connector blocks 111A and 111B enable the teapot 112 to be inserted in the base 101 with the handle 115 to the right and in the gap 107 for handling with the right hand. However, the teapot 112 can be rotated 180° to align the handle 115 with the gap 108 for handling with the left hand.

Figure 8A:
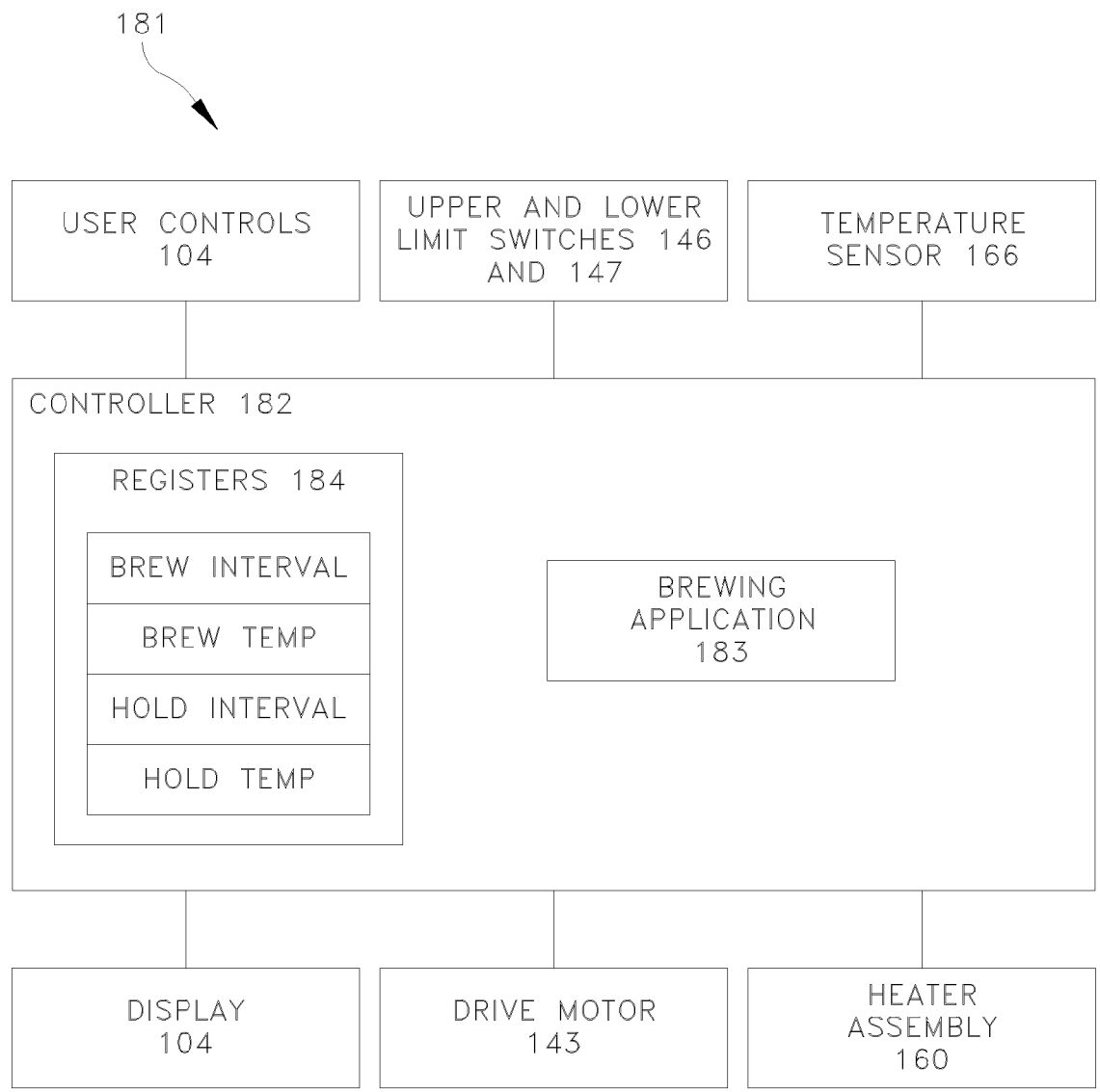
FIGS. 8A and 8B are a simplified schematic and flow chart, respectively, that are useful in understanding the operation of this invention.

An objective of this invention is to provide ease of use through the implementation of an automated control system. FIG. 8A is a simplified schematic diagram of one embodiment 181 of such a control system 181 supported in the base 101 as shown in FIG. 5. Still referring to FIG. 8A, the control system 181 includes a controller 182, typically a computer that runs a brewing application 183 on the basis of information stored in registers 184. The user controls 104, the limit switches 146 and 147 and temperature sensor 166 constitute inputs. The controller 182 uses drivers (not shown) to control the operation of the display 104, the drive motor 143 and the heater assembly 160.

Figure 8B:
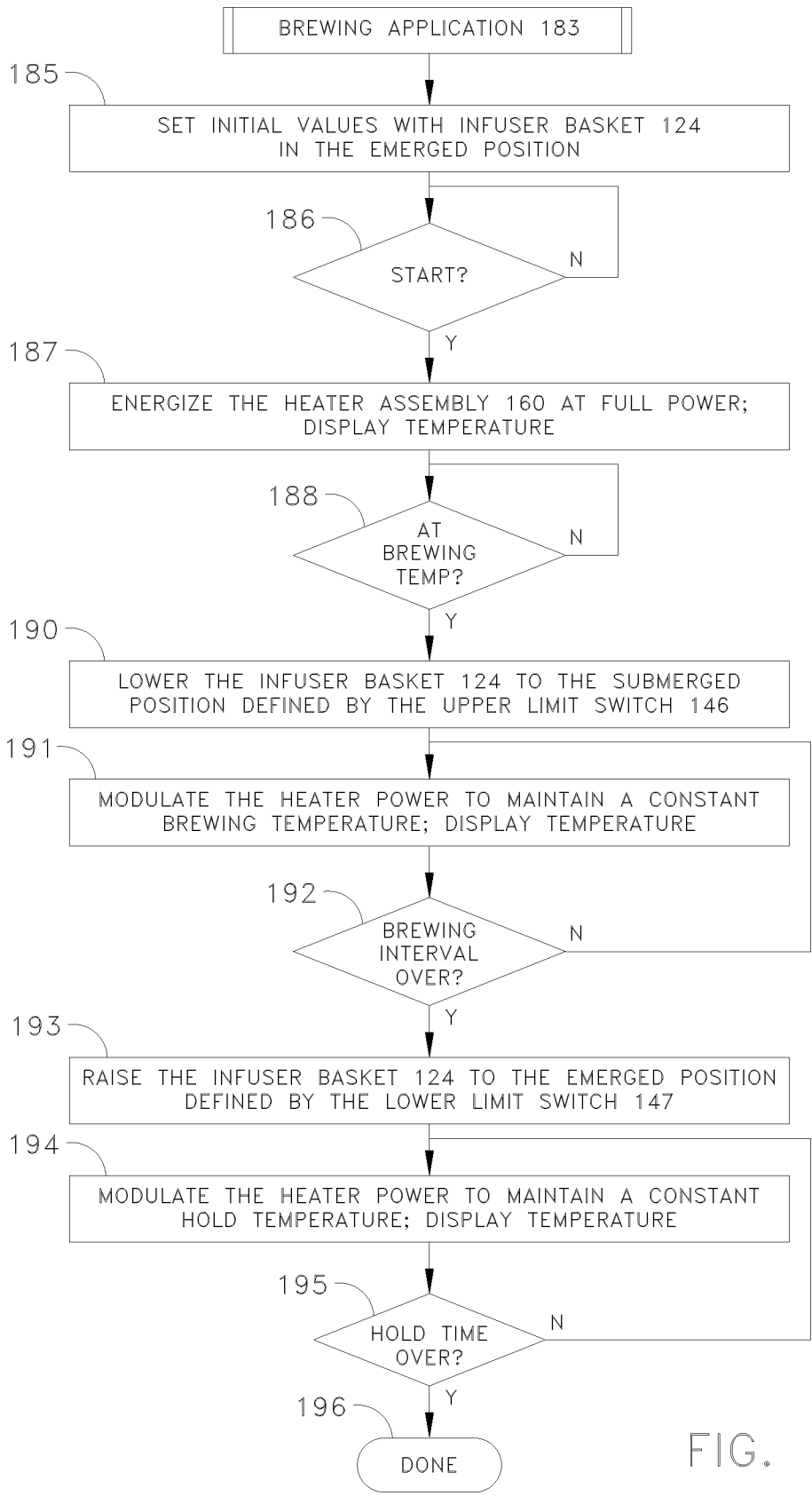

FIG. 8B depicts one embodiment of the typical brewing application 183. It is assumed for purposes of this discussion that an individual has filled the teapot with water and the infuser basket 124 and has loaded the infuser basket 124 in the cover 120 and closed the cover 120 so the infuser basket 124 is in the emerged position. In step 185 the user sets one or more initial values into the registers 184. Various procedures for setting initial values could be implemented. For example, the controller 182 could store fixed values in the registers 184. In another example, a user could install the value through the control panel. Alternatively, the user could select a tea from a menu thereby automatically loading the initial values in the registers 184. Any of these systems could also enable the user to modify the initial values. Methods and apparatus for defining initial values are well known to those of ordinary skill in the art.

Next, the user activates the brewing process. Alternatively, some external event, such as clock time, could initiate the brewing process. Once that happens, step 186 transfers control to step 187 that causes the heater assembly 160 to energize the header assembly 160 at full power thereby to heat the water 156 in the teapot 112. The temperature value may also be displayed.

When the water 156 reaches the brewing temperature defined by the BREW TEMP value, the brewing interval defined by the BREW INTERVAL value, begins and step 188 transfers control to step 190. Now the drive motor 143 is energized in a direction that lowers the infuser basket 124 to the submerged position shown in FIG. 5, proximate the heater assembly 160, where it is stopped by the signal received from the upper limit switch 146.

Step 191 begins to modulate the power to the heater assembly 160 to maintain the constant brewing temperature defined by the BREW TEMP value and signals from the temperature of the water as seen by the sensor 166. As specifically shown in FIG. 5, during this interval the heater assembly 160 induces convective currents in the contents 156 surrounding the heater assembly 160 as represented by arrows 180. The heater assembly 160 with its semispherical outer shell 163 positioned in the center of the container base concentrates the rising convective currents above the apex of the heater which is located just below the suspended infuser basket 124. With the disclosed heater assembly 160, currents can continue to be induced even at very low power, such as 5% of the rated power of the heater. Consequently it is possible to maintain the convective currents even as step 191 modulates the heater power to maintain the defined constant brewing temperature. These currents help carry the infused substance to the container and in turn this distributes the substance extracted from the tea leaves throughout the container. These currents also minimize any temperature stratification so the temperature sensor 166 provides an accurate reading.

When the brewing interval is over, step 192 transfers control to step 193 to raise the infuser basket 124 back to its emerged position in the cover 120 as shown in FIG. 4, where it is stopped due to the signal provided by the lower limit switch 147. Consequently, the brewing process terminates and isolates the tea leaves from what is now the brewed tea in the teapot 112.

In this particular embodiment, step 194 obtains the HOLD TEMP and HOLD INTERVAL values from the registers 184 in FIG. 8A and modulates the heater power to maintain a constant serving temperature. Again, this temperature can also be displayed. Such a serving temperature could be continued until the user turns off the system. Alternatively if the system uses the HOLD INTERVAL option, control continues until the end of that HOLD INTERVAL whereupon step 195 transfers control to step 196 to terminate the brewing operation in an orderly manner.

As will now be apparent, a tea brewing system such as shown in FIGS. 1 through 5 enables an individual to brew tea to the most exacting standards in an easy and intuitive operation. Specifically, the ability to control brewing time and temperature addresses the diverse temperature and steeping time criteria for a variety of teas. The use of an infuser basket that can move between emerged and submerged positions enables the spent infusible materials to be isolated immediately upon completion of steeping. Further, the tea can be maintained at a proper serving temperature for an extended time.

Figure 9:
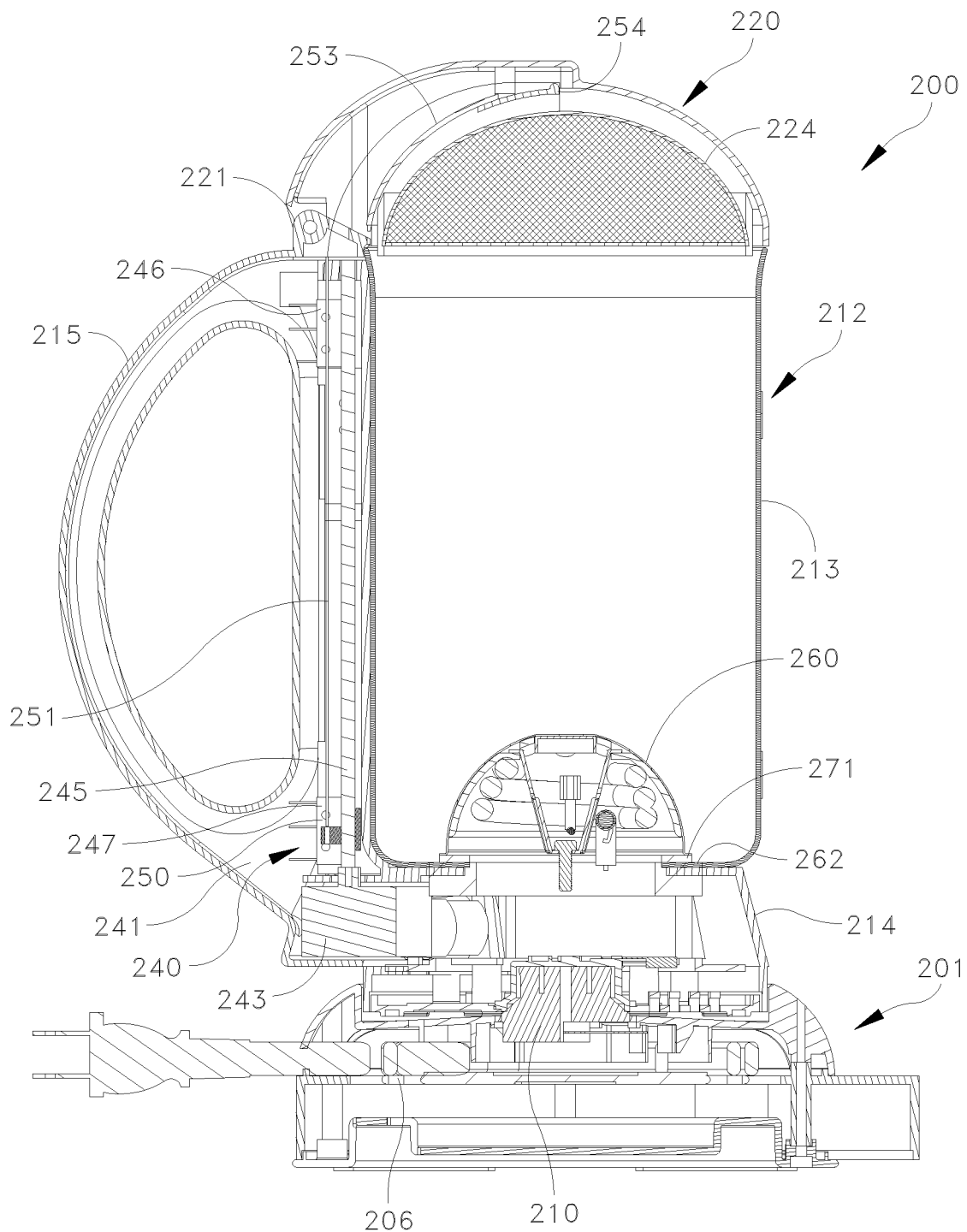
FIG. 9 is a cross sectional view of a coffee brewing apparatus as a second embodiment according to the invention, with the coffee infuser basket stored inside the lid.
Figure 10:
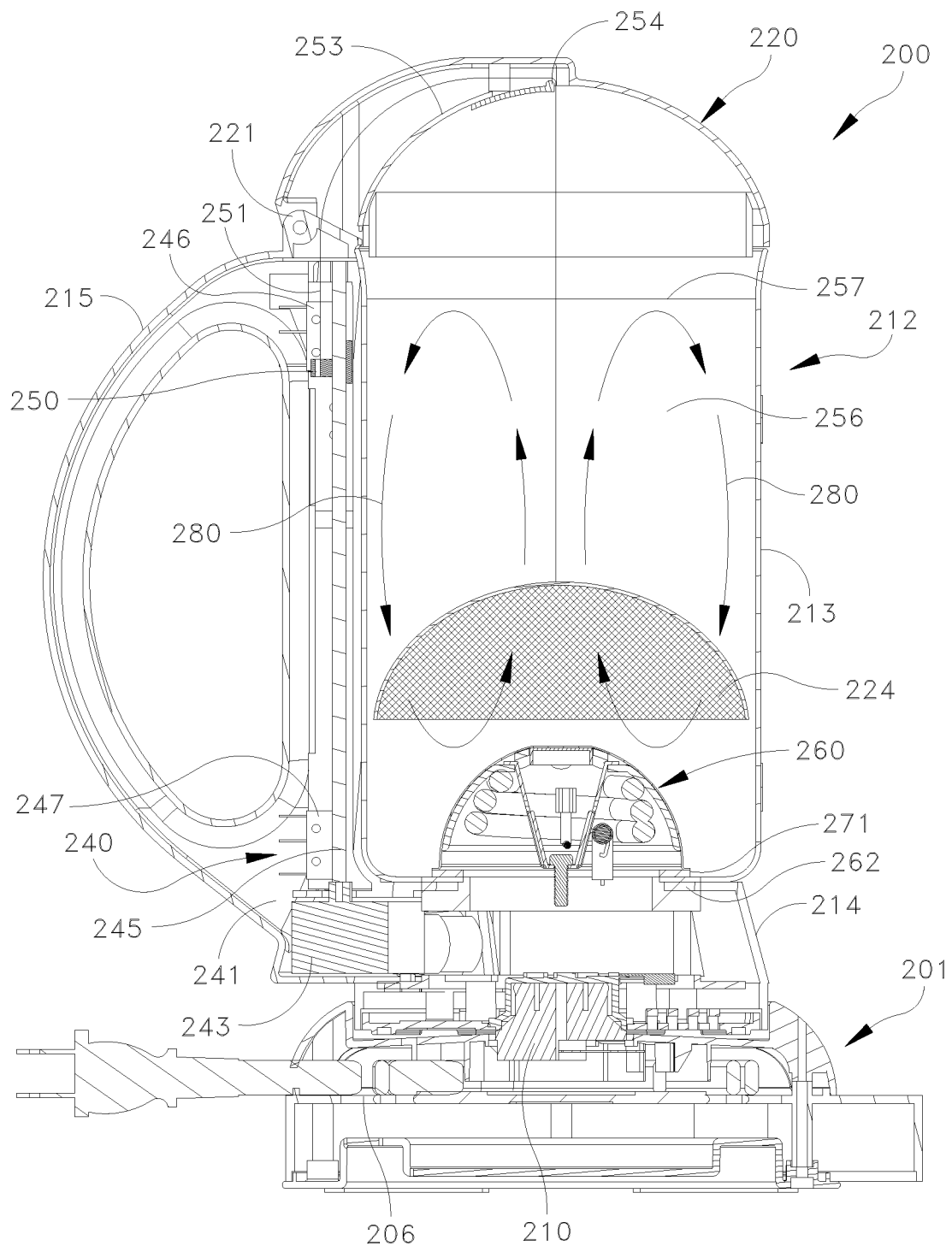
FIG. 10 is a cross sectional view of the coffee brewing apparatus shown in FIG. 9, with a coffee infuser basket submerged in a hot liquid during the brewing process.

Many of the features incorporated in the tea steeper of FIGS. 1 through 5 can be incorporated in a coffee brewing apparatus such as shown in FIGS. 9 and 10. In this embodiment a base unit 201 with a floor 206 carries a central connector 201 and separate connector blocks (not shown in the figures). A coffeepot 212 comprises a beverage container 213 and a base 214. A handle 215, formed integrally with the base 214 supports a cover 220. A hinge 221 allows the cover 220 to open and the coffeepot 212 with brewed beverage to be removed from the base 201. The cover 220 receives an infuser basket 224 in an emerged position. In FIGS. 9 and 10 the infuser basket 224 is shown schematically, but has the same construction as the infuser basket 124 in FIGS. 6A and 6B.

Still referring to FIGS. 9 and 10, an electro-mechanical positioner assembly 240 lies within a chamber 241. The handle 215 supports a drive motor 243 mounted in an orientation and operated at a speed that eliminates the need for any transmission. Consequently, in this embodiment the drive motor 243 directly rotates a vertical output shaft 245 with an upper limit switch 246 and a lower limit switch 247. A shuttle 250 mounted on the output shaft 245 carries the cable 251 that extends up through the handle 215, past the hinge 221 through guiding blocks (not shown, but analogous to those shown in FIG. 4) to a turning point 254 to establish the magnetic connection to the infuser basket 224.

The coffeepot 212 includes a heater assembly 260 that has structure analogous to that of the heater assembly 160 in FIGS. 4 and 5. The heater assembly 260 attaches to an inward projecting flange 262 at the bottom of the coffeepot 212. A seal 271 intermediate the base of the heater assembly 260 and the flange 262 represent a water tight seal when the heater assembly 260 is clamped to the base 214 in essentially the same manner as shown in FIGS. 4 and 5. The specific implementation of such a sealing structure will be apparent to those skilled in the art.

Figure 3:
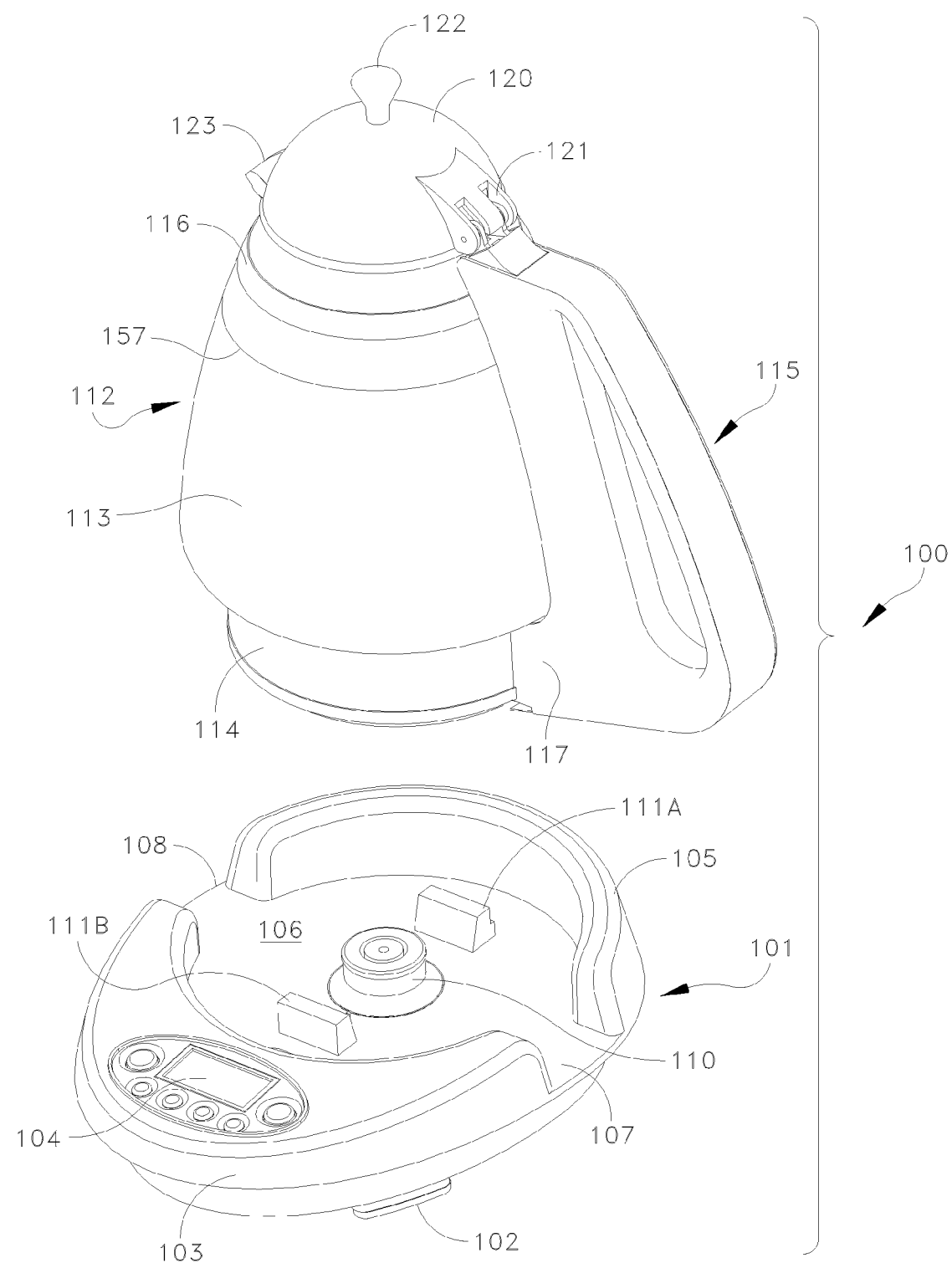
FIG. 3 is still another perspective view of the tea steeping apparatus of FIG. 1 with its teapot lifted off its base.

In addition, in the position shown in FIGS. 9 and 10 an electrical contact is provided to the electrical heater 260 through the central connector 210 and related structure in the base 214. Connector blocks, like the connector block 111A and 111B in FIGS. 3 and 5, provide a conductive path for power from a temperature system in the heating system 260 and to the drive motor 243 with the same advantages as described with respect to the corresponding structure in FIGS. 3 and 5.

Operating control is essentially the same as described with respect to the first embodiment. A user opens the cover 220 to remove and fill the infuser basket 224 with an appropriate amount of coffee. The user pours water into the coffeepot 212 to the desired level. The control system, analogous to the control system shown in FIGS. 8A and 8B heats the water to an optimal brewing temperature, such as 90°-95° C. Upon reaching that temperature, the control circuit energizes the motor 243 and lowers the infuser basket 224 to its submerged position shown in FIG. 10 and maintains the contents 256 at the optimal brewing temperature. The proximity of the infuser basket to the heater assembly 260 and the semispherical periphery of the heater assembly 260 combine to efficiently produce convective currents represented by arrows 280 to assist in carrying the infused substance throughout the beverage container 313 and in preventing temperature stratification. When the brewing interval is ended, the control energizes the drive motor 243 to retract the infuser basket 224 to the emerged position as shown in FIG. 9. The control also may modulate the temperature of the brewed coffee at a serving temperature for an extended period of time. As will therefore be apparent, this second embodiment of the invention is characterized by all the advantages achieved by the first embodiment of the invention.

Figure 11:
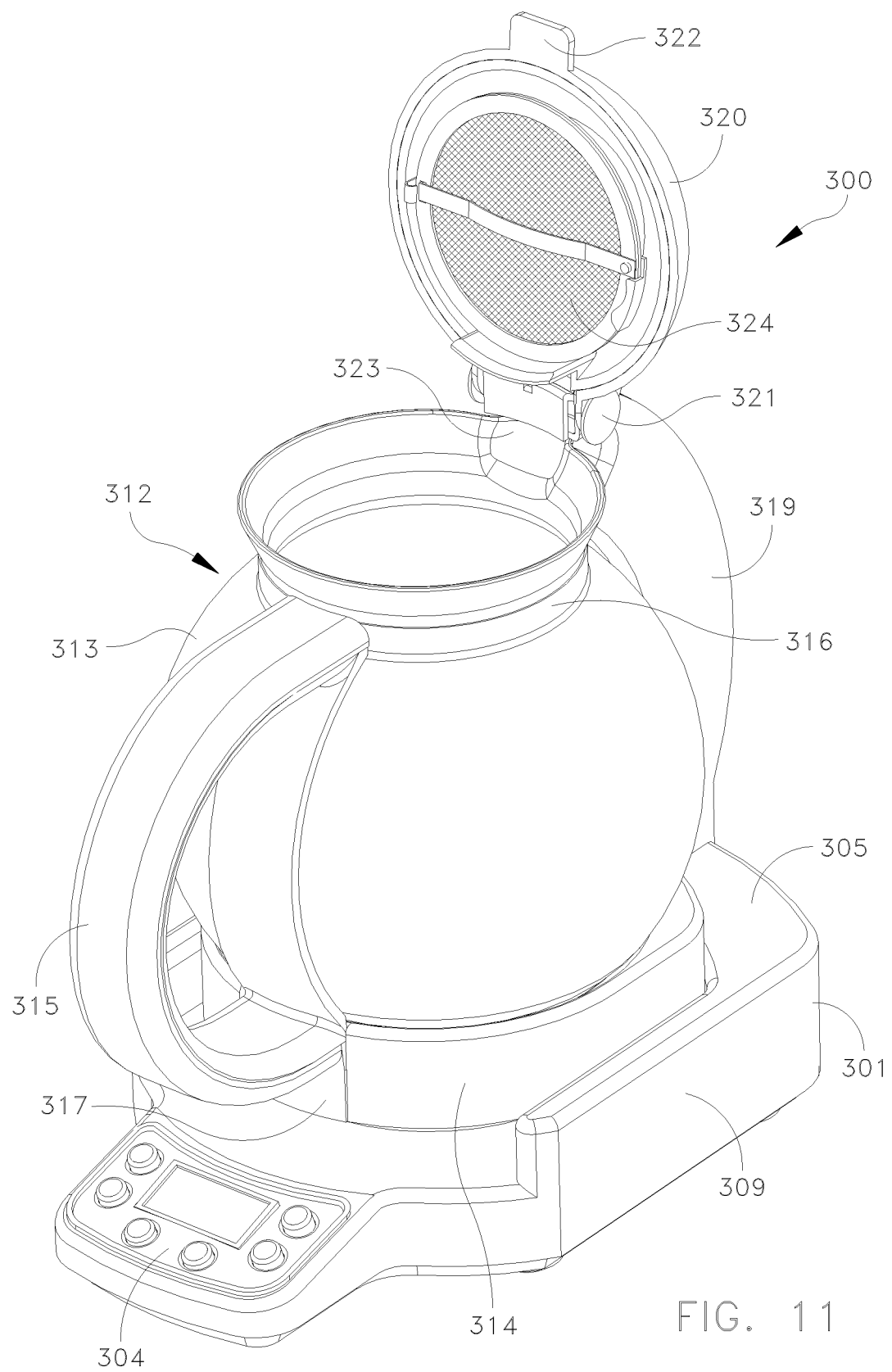
FIG. 11 is a perspective view of another tea steeper, with its lid open, as a third embodiment of this invention.
Figure 12:
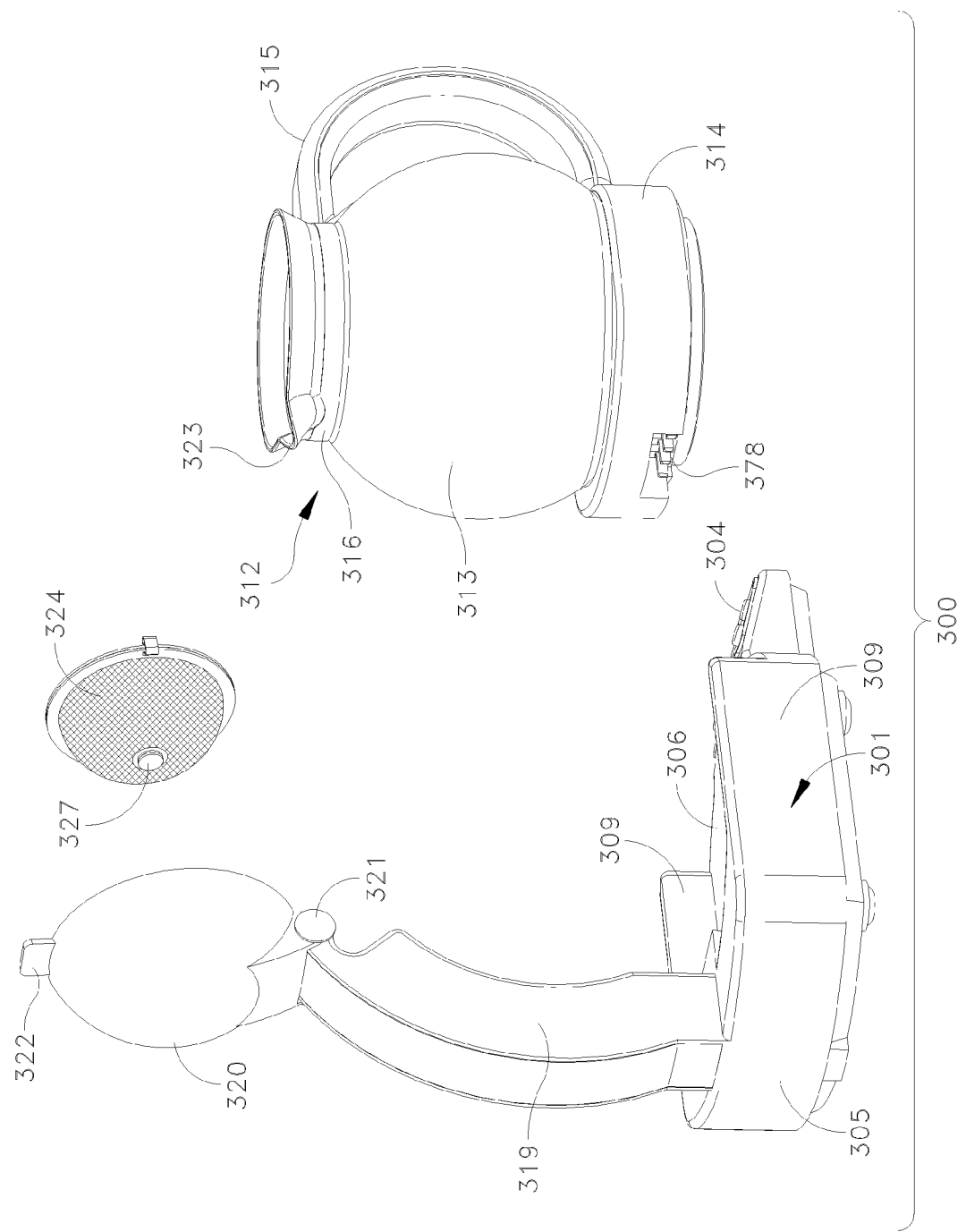
FIG. 12 is a perspective view of the tea steeper of FIG. 11 with an open lid, a tea infuser basket removed and a teapot removed from its base.
Figure 13:
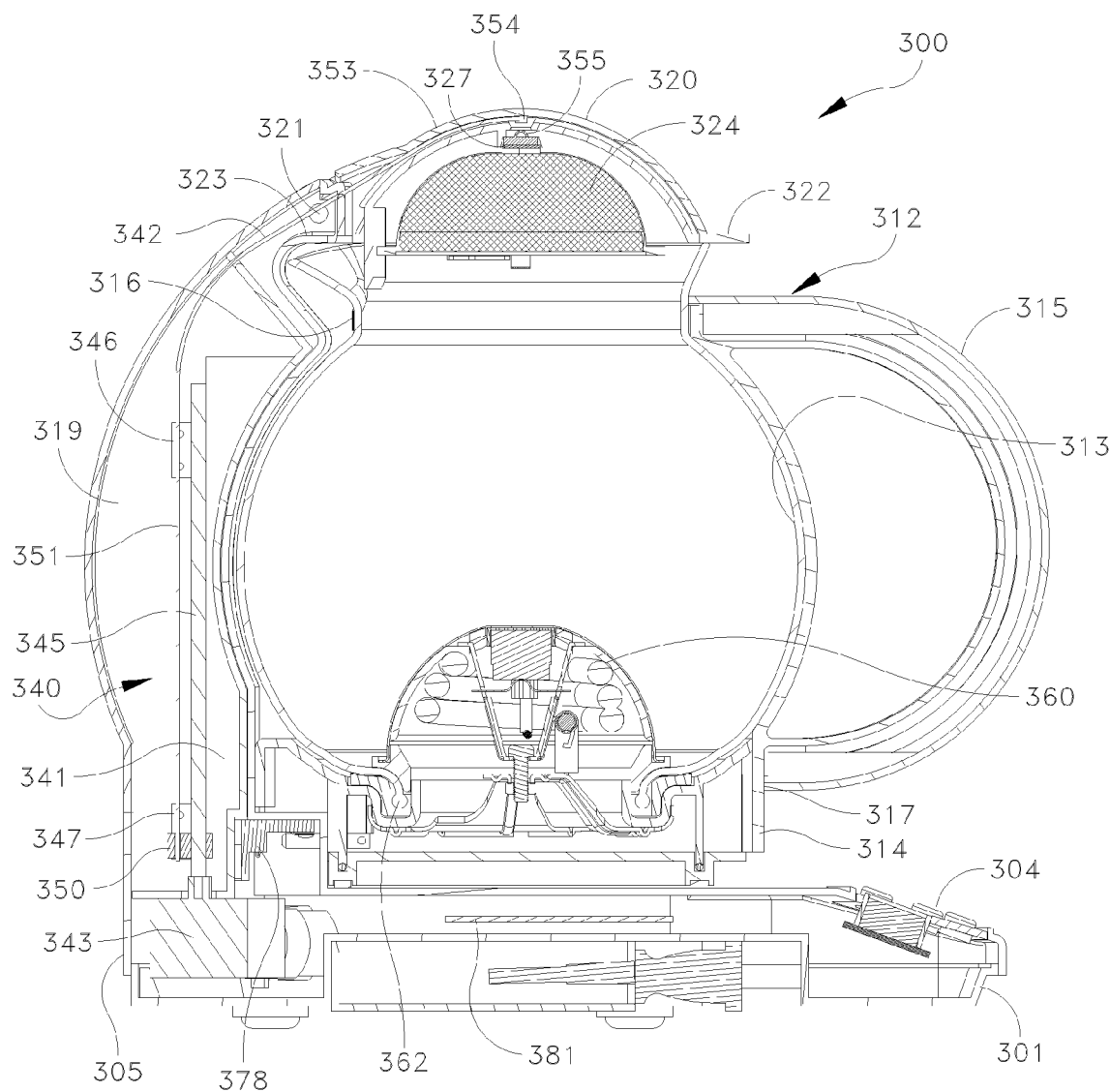
FIG. 13 is a cross sectional view of the tea steeper of FIG. 11 taken along lines 13-13 with an infuser basket in an emerged position.

In the first and second embodiments of this invention, the handle 115 in FIG. 1 and the handle 215 in FIG. 9 support and carry the electro-mechanical positioning apparatus. FIGS. 11 through 13 depict an alternative by which the electro-mechanical positioning apparatus is located in a base.

FIGS. 11 through 13 depict tea steeping apparatus 300 that includes a base unit 301 with a display and control panel 304 for carrying the teapot 312. The teapot 312 includes a bulbous beverage container 313 that rests on a base 314 and a handle 315 with a band 316 and a handle base 317 that enables an individual to insert and remove the teapot 312 from the base 301 and to pour beverage therefrom.

As particularly shown in FIGS. 12 and 13, the base 301 includes an upright column 319 that carries a cover 320 on a hinge 321. The cover 320 includes a tab 322 to allow it to pivot the cover 320 from an open position as shown in FIG. 11 and a closed position as shown in FIG. 13. Like the other embodiments, the cover 320 is semispherical to receive an infuser basket 324 with a magnetic pickup 327 having the structure of FIGS. 6A and 6B. The teapot 312 additionally includes an integral heater 360 that seals against a glass bead 362. In this case, however, the base 301 includes a housing 305 with side extensions 320 that define a floor 306 that opens to the front. Slide power connectors 378 engage complementary terminals in the base 301 in a manner as known in the art. So the teapot apparatus 300 has a front-loading teapot 312.

The column 319 carries the electro-mechanical positioning system 340 that, in this particular embodiment, includes a drive motor 343, like the drive motor 243, in FIGS. 8 and 9, with an output shaft 345 and an upper limit switch 346 and a lower limit switch 347. A shuttle 350 travels on the output shaft 345 and attaches to a cable 351. The cable 351 extends up through a passage 341 and a passage 342 at the upper end of the column 319 past the hinge 321. Guides 353 lead the cable 351 to a turning point 354 where it attaches to a magnet 355. Consequently all other respects the teapot operates in the same manner as each of the first and second embodiments of this invention.

FIGS. 1 through 13 depict three specific embodiments of a hot beverage brewing with common features. First, each beverage container, be it in the form of a teapot or coffeepot, has an integral heater. During operation, this integral heater with a semispherical surface promotes convective currents during a brewing interval. Each beverage container can easily be inserted and removed from a base unit that contains connections for power and a control system for filling the container with liquid, adding infusible material to one of the infuser baskets, brewing the beverage and removing the pot for purposes of pouring or cleaning. Each apparatus provides a structure for assuring that the infusible material only resides in a liquid during the brewing cycles to avoid the deleterious effects of over brewing. Each apparatus maintains liquid at a constant, optimal brewing temperature over the brewing interval. Each provides isolation of the infusible material at the completion of the brewing interval. In the first and second embodiments the positioning assemblies are located in the handle of the beverage container. In the third embodiment the positioner assembly is integral with the base.

This invention has been disclosed in terms of certain embodiments. It will be apparent that many modifications can be made to the disclosed apparatus without departing from the invention. Consequently, it is the intent of the appended claims to cover each all such variation as comes within the true spirit and scope of this invention.

What is claimed as new and desired to be secured by Letters Patent of the United States is:

1. Apparatus for brewing a beverage from an infusible material and a liquid during a brewing interval, said apparatus comprising:

A) beverage container means for containing the liquid including means for pouring the beverage therefrom,
  B) base means for detachably supporting said beverage container means during the brewing interval, said beverage container means being removable from said base means for pouring brewed beverage therefrom,
  C) infuser basket means for containing the infusible material,
  D) heater means in said beverage container means for heating the liquid in said beverage container means to a brewing temperature, and
  E) electro-mechanical positioning means attached to said infuser basket means and responsive to the liquid reaching the brewing temperature for controlling the submerging of said infuser basket means in the liquid for the brewing interval and for controlling the removal of said infuser basket means to an emerged location from the liquid upon completion of the brewing interval, said beverage container means including handle means for lifting said beverage container means to pour brewed beverage therefrom, said handle means supporting a portion of said electro-mechanical positioning means.

2. Apparatus as recited in claim 1 additionally including means for attaching said heater means to said beverage container means as an integral part thereof.

3. Apparatus as recited in claim 2 wherein said heater means includes an electrical heater, said apparatus additionally including complementary releasable electrical connector means on said heater means and said base means for enabling said beverage container means to be removed from and replaced on said base means.

4. Apparatus as recited in claim 3 wherein said heater means includes an outer semispherical shell that contacts liquid in said beverage container means.

5. Apparatus as recited in claim 1 wherein said electro-mechanical positioning means additionally includes control means for locating said infuser basket means proximate and above said heater means at the submerged position.

6. Apparatus as recited in claim 5 wherein said control means additionally includes brewing temperature control means for controlling said heater means to maintain the contents of said beverage container means at a liquid temperature optimized for the beverage being brewed.

7. Apparatus as recited in claim 5 wherein said control means additionally includes means for establishing a serving temperature for the contents of said beverage container means to be maintained after the beverage is brewed.

8. Apparatus as recited in claim 1 wherein said beverage container means includes cover means for closing said beverage container means, said cover means being shaped to receive said infuser basket means in the emerged position.

9. Apparatus as recited in claim 1 said electro-mechanical positioning means and said infuser basket means include complementary releasable attachment means thereon whereby said infuser basket means can be attached and detached from said electro-mechanical positioning means.

10. Apparatus as recited in claim 9 wherein said complementary releasable attachment means include a magnetic pickup on said infuser basket means and, on said electro-mechanical positioning means:
  i) a magnet,
  ii) a flexible connector attached to said magnet,
  iii) a shuttle attached to said flexible connector, and
  iv) a bidirectional drive that moves said shuttle in a linear fashion between first and second positions corresponding to the emerged and submerged positions, respectively.

11. Apparatus as recited in claim 5 wherein said control means additionally includes control means for creating convective currents as best suited for the extraction process.

12. Apparatus as recited in claim 9 wherein said complementary releasable attachment means include a magnetic element and a paramagnetic element.

13. Apparatus for brewing a beverage by infusing an infusible material with a liquid during a brewing interval, said apparatus comprising:
   A) a beverage container for the liquid that includes a handle, a spout for pouring the beverage therefrom and electrical contacts,
   B) a base that includes electrical contacts and means for locating said beverage container on said base whereby said electrical contacts on said base and beverage container align and enable said beverage container to be removed from said base,
   C) a heater in said beverage container for heating the liquid in said beverage container to a predetermined brewing temperature,
   D) an infuser basket having a permeable body for the infusible material, and
   E) an electro-mechanical positioner attached to said infuser basket to lower said infuser basket into the liquid during the brewing interval and to raise said infuser basket from the beverage container contents to an emerged location upon completion of the brewing interval whereby both the lowering and raising operations occur in a controlled manner and wherein said beverage container handle enables said beverage container to be lifted from said base to pour brewed beverage therefrom and supports a portion of said electro-mechanical positioning means.

14. Apparatus as recited in claim 13 wherein said beverage container includes a hinged cover shaped to receive said infuser basket in the emerged position.

15. Apparatus as recited in claim 13 wherein said electro-mechanical positioner and said infuser basket include complementary releasable attachment elements thereon whereby said infuser basket can be attached and detached from said electro-mechanical positioner.

16. Apparatus as recited in claim 15 wherein said releasable attachment elements include a magnetic pickup on said infuser basket and on said electro-mechanical positioner:
   i) a magnet,
   ii) a flexible connector attached to said magnet,
   iii) a shuttle attached to said flexible connector,
   iv) a bidirectional drive that moves said shuttle in a linear fashion between first and second positions corresponding to the emerged and submerged positions, respectively.

17. Apparatus as recited in claim 16 wherein said beverage container includes a handle for lifting said beverage container to pour brewed beverage therefrom and a cover that closes said beverage container means, said handle supporting said bidirectional drive and said shuttle and including guides that guide said flexible connector to said magnet through said handle and said cover and wherein said infuser basket includes a paramagnetic plate for attaching to said magnet.

18. Apparatus as recited in claim 15 wherein said complementary releasable attachment elements include a magnetic element and a paramagnetic element.

19. Apparatus for brewing a beverage from an infusible material and a liquid during a brewing interval, said apparatus comprising:
   A) beverage container means for containing the liquid including means for pouring the beverage therefrom,
   B) base means for detachably supporting said beverage container means during the brewing interval, said beverage container means being removable from said base means for pouring brewed beverage therefrom,
   C) infuser basket means for containing the infusible material,
   D) heater means in said beverage container means for heating the liquid in said beverage container means to a brewing temperature, and
   E) electro-mechanical positioning means for controlling the submerging of said infuser basket means in the liquid for the brewing interval and for controlling the removal of said infuser basket means to an emerged location from the liquid upon completion of the brewing interval, said positioning means and said infuser basket means including complementary releasable attachment means including a magnetic pickup on said infuser basket means and on said positioning means:
   i) a magnet,
   ii) a flexible connector attached to said magnet,
   iii) a shuttle attached to said flexible connector,
   iv) a bidirectional drive that moves said shuttle in a linear fashion between first and second positions corresponding to the emerged and submerged positions, respectively whereby said infuser basket means can be attached and detached from said electro-mechanical positioner means.

20. Apparatus as recited in claim 19 wherein said beverage container means includes handle means for lifting said beverage container means to pour brewed beverage therefrom and cover means for closing said beverage container means, said handle means supporting said bidirectional drive and said shuttle and including means for guiding said flexible connector to said magnet through said handle means and said cover means and wherein said infuser basket means includes a paramagnetic plate for attaching to said magnet.

* * * * *